United States Patent
Kawahara et al.

(10) Patent No.: US 12,384,925 B2
(45) Date of Patent: Aug. 12, 2025

(54) POLYMER-TYPE CONDUCTIVE PASTE, CONDUCTIVE FILM, AND SOLID ELECTROLYTIC CAPACITOR ELEMENT

(71) Applicant: SHOEI CHEMICAL INC., Tokyo (JP)

(72) Inventors: Megumi Kawahara, Tosu (JP); Shohei Araki, Tosu (JP)

(73) Assignee: SHOEI CHEMICAL INC., Tokyo (JP)

( * ) Notice: Subject to any disclaimer, the term of this patent is extended or adjusted under 35 U.S.C. 154(b) by 0 days.

(21) Appl. No.: 18/864,316

(22) PCT Filed: Apr. 18, 2023

(86) PCT No.: PCT/JP2023/015416
§ 371 (c)(1),
(2) Date: Nov. 8, 2024

(87) PCT Pub. No.: WO2023/218872
PCT Pub. Date: Nov. 16, 2023

(65) Prior Publication Data
US 2025/0163279 A1    May 22, 2025

(30) Foreign Application Priority Data
May 9, 2022  (JP) .................................. 2022-076885

(51) Int. Cl.
*H01G 9/15* (2006.01)
*C09D 5/24* (2006.01)
(Continued)

(52) U.S. Cl.
CPC ................. *C09D 5/24* (2013.01); *C09D 7/61* (2018.01); *C09D 7/63* (2018.01); *C09D 7/70* (2018.01);
(Continued)

(58) Field of Classification Search
CPC ............. C09D 5/24; H01G 9/15; H01G 9/042
See application file for complete search history.

(56) References Cited

U.S. PATENT DOCUMENTS

2018/0137988 A1    5/2018  Vilc et al.

FOREIGN PATENT DOCUMENTS

| JP | H10162646 A | 6/1998 |
| JP | 2008124030 A * | 5/2008 |

(Continued)

*Primary Examiner* — David M Sinclair
(74) *Attorney, Agent, or Firm* — Alleman Hall & Tuttle LLP

(57) ABSTRACT

This invention provides a polymer type conductive paste that can provide a highly reliable conductive layer even in high humidity environments. The polymer type conductive paste in accordance with the embodiment of the present invention contains conductive metal powder, binder resin, organic solvent, and specific additives, wherein said binder resin is polyvinyl butyral resin, wherein said specific additives are one or more selected from the group consisting of stearic acid, lauric acid, octadecyl butanedioic acid, benzoic acid, acetamidophenol, aminophenol, catechol, and N,N-bis (2-hydroxyethyl) coco alkylamine, and wherein said specific additives are contained at the content of not less than 0.01 parts by mass and not more than 3.0 parts by mass per 100 parts by mass of said conductive metal powder.

7 Claims, 1 Drawing Sheet

(51) Int. Cl.
  *C09D 7/40*   (2018.01)
  *C09D 7/61*   (2018.01)
  *C09D 7/63*   (2018.01)
  *C09D 129/14* (2006.01)
  *H01G 9/042*  (2006.01)
  *C08K 5/09*   (2006.01)
  *C08K 5/092*  (2006.01)
  *C08K 5/13*   (2006.01)
  *C08K 5/17*   (2006.01)
  *C08K 5/18*   (2006.01)
  *C08K 5/20*   (2006.01)
  *C08K 7/18*   (2006.01)

(52) U.S. Cl.
  CPC ........... *C09D 129/14* (2013.01); *H01G 9/042* (2013.01); *C08K 5/09* (2013.01); *C08K 5/092* (2013.01); *C08K 5/13* (2013.01); *C08K 5/17* (2013.01); *C08K 5/18* (2013.01); *C08K 5/20* (2013.01); *C08K 7/18* (2013.01)

(56) References Cited

FOREIGN PATENT DOCUMENTS

| | | |
|---|---|---|
| JP | 2020500427 A | 1/2020 |
| WO | 2013111438 A1 | 8/2013 |

\* cited by examiner

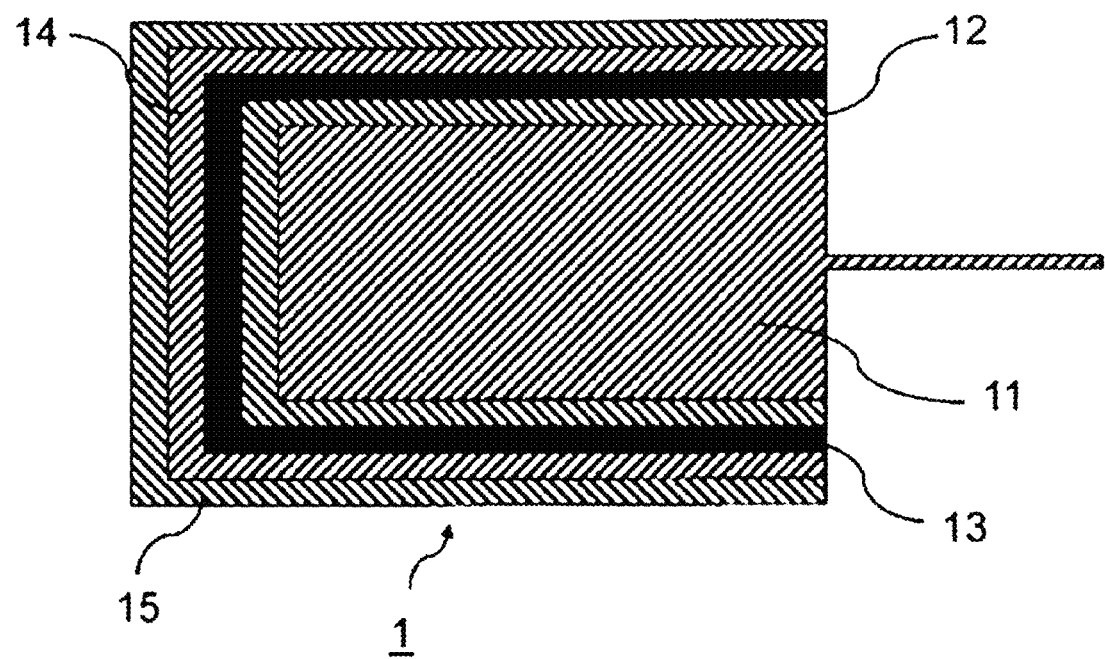

POLYMER-TYPE CONDUCTIVE PASTE, CONDUCTIVE FILM, AND SOLID ELECTROLYTIC CAPACITOR ELEMENT

FIELD OF THE INVENTION

This invention relates to polymer type conductive pastes, conductor film, and solid electrolytic capacitor elements that can be suitably used for forming conductive layers in solid electrolytic capacitor elements such as tantalum capacitors and electrodes for multilayer ceramic electronic components.

DESCRIPTION OF THE RELATED ART

The polymer type conductive paste of the present invention is used, for example, in the manufacturing process of solid electrolytic capacitor elements.

Solid electrolytic capacitor elements generally have a structure in which the surface of an anode body made of a metal having valve action is subjected to a chemical conversion treatment to form a dielectric layer, and an electrolyte layer made of a conductive polymer or the like, a carbon layer, and a cathode layer comprising conductive paste are formed on the surface in this order. The cathode layer is then bonded to a cathode lead terminal using conductive adhesive, and an anode body is joined to an anode lead terminal by welding, and a mold resin is applied to the outside of these to form a capacitor component.

FIG. 1 shows an example of the structure of a solid electrolytic capacitor element.

The solid electrolytic capacitor element 1 has a structure including a valve-action metal sintered body 11 made by sintering a valve-action metal such as tantalum, niobium, titanium, and aluminum, an oxide film layer 12 formed on the surface of the sintered body 11, and a solid electrolyte layer 13, a carbon layer 14, and a conductor layer 15 formed thereon. Here, the sintered body 11 and the oxide film layer 12 are used as the anode body and the dielectric layer, respectively, while the carbon layer 14 and the conductor layer 15 on the solid electrolyte layer 13 are used as the cathode body.

The oxide film layer 12 is preferably the sintered body that itself is oxidized, but other oxides may also be used.

Manganese dioxide and conductive polymers are widely used as the solid electrolyte layer 13.

Usually, carbon layer 14 is formed by applying and drying carbon paste with carbon powder dispersed in an organic vehicle. This carbon layer 14 is believed to lower the ESR (equivalent series resistance) by lowering the contact resistance between the solid electrolyte layer 13 and the conductor layer 15.

The conductor layer 15 is usually formed by coating, drying and/or curing conductive paste in which metallic powder such as silver is dispersed in an organic vehicle.

Such solid electrolytic capacitor elements are widely known conventional technologies, as described in Patent Document 1 and Patent Document 2.

In recent years, these solid electrolytic capacitor elements are often used in high humidity environments, causing silver to ionize in the conductor layer containing silver powder. This results in so-called migration, which can contribute to short circuits, etc., undermining the reliability of the elements.

Patent document 1 describes a solid electrolytic capacitor element having, on the surface of an anode body, at least a dielectric layer, a solid electrolyte layer, a carbon layer including a first resin component, and a conductor layer including a second resin component, wherein the solid electrolytic capacitor element has a low ESR degradation and a suppressed variation of ESR change over time for each product by making the difference between the hydrogen bonding component value on the carbon layer surface and the hydrogen bonding component value on the conductor layer surface within a specific range.

Patent Document 2 attempts to solve the above problem by dispersing conductive polymer particles in the solid electrolyte layer and using a polymer with controlled water content as the resin component in the conductor layer. Specifically, it is disclosed that the water content of the conductor layer can be reduced by dispersing thiophene polymer particles in the solid electrolyte layer to prevent silver ion migration and by using a vinyl acetal polymer with a small amount of residual hydroxyl groups in the polymer as the resin component of the conductor layer. Patent Document 2 discloses that the residual amount of hydroxyl groups is 35 mol % or less, preferably not less than 10 mol % and not greater than 25 mol %, and an example of such a polymer is "BH—S" (polyvinyl butyral resin) manufactured by Sekisui Chemical Co., LTD.

PRIOR ARTS

Patent Literature

[Patent Document 1] International Patent Publication No. 2013/111438
[Patent Document 2] U.S. Patent Application Publication No. 2018/0137988

SUMMARY OF INVENTION

Problems to be Solved by the Invention

However, dispersion of conductive polymer particles in the solid electrolyte layer only suppresses the migration of silver ions in the solid electrolyte layer and does not suppress the occurrence of migration itself. Also, in Patent Document 1 by the applicant, polyvinyl butyral resins such as "BH—S" and "KS-5" with residual hydroxyl groups of 35 mol % or less are used in the conductive layer. However, the reliability of these resins when exposed to high humidity for long periods of time is not sufficient. According to the research/examination by the inventors, the use of polyvinyl butyral resin with a small amount of residual hydroxyl groups can be expected to suppress the occurrence of migration to some extent with a limited and insufficient effect, and does not necessarily lead to improved reliability of the device.

Moisture resistance can be improved by replacing polyvinyl butyral resin with, for example, an epoxy resin that provides a dense cured film. However, since the cured film of epoxy resin is very hard, it is not suitable for some applications. Therefore, there is a high demand for improved moisture resistance for pastes using polyvinyl butyral resin.

According to the research/examination of the inventors, adding compounds such as 5-amino-2hydroxybenzoic acid, naphthol, cresol, and salicylic acid to conductive pastes using polyvinyl butyral resin improved moisture resistance to some extent, but not necessarily enough.

Against the above background, the inventors have made a diligent study of polymer type conductive pastes using polyvinyl butyral resin, and as a result, have found that the moisture resistance of polymer type conductive pastes can be dramatically improved by blending a specific compound in the paste, leading to the completion of the present invention.

In other words, the purpose of this invention is to provide a polymer type conductive paste that can provide a highly reliable conductive layer even in high humidity environments.

Means for Solving Problem

The present invention, which solves the above problem, relates to the following polymer type conductive paste, conductor film, and solid electrolytic capacitor element.

(1) A polymer type conductive paste characterized in that the polymer type conductive paste contains conductive metal powder, binder resin, organic solvent, and specific additives, wherein the binder resin is polyvinyl butyral resin, said specific additives are one or more selected from the group consisting of stearic acid, lauric acid, octadecyl butanedioic acid, benzoic acid, acetamidophenol, aminophenol, catechol, and N,N-bis(2-hydroxyethyl) coco alkylamine, and said specific additive is contained at the content of not less than 0.01 parts by mass and not more than 3.0 parts by mass per 100 parts by mass of said conductive metal powder.

(2) The polymer type conductive paste as described in (1) above, wherein said specific additive is octadecyl butanedioic acid.

(3) The polymer type conductive paste as described in (1) above, wherein the hydroxyl group content in the polyvinyl butyral resin is 30 mol % or less.

(4) The polymer type conductive paste as described in (3) above, wherein the hydroxyl group content in the polyvinyl butyral resin is 25 mol % or less.

(5) The polymer type conductive paste as described in (1) above, wherein the conductive metal powder is silver-based powder.

(6) A conductor film characterized in that the conductor film is formed from the polymer type conductive paste as described in any one of (1) to (5) above.

(7) A solid electrolytic capacitor element characterized in that the solid electrolytic capacitor element has at least a dielectric layer, a solid electrolyte layer, a carbon layer, and a conductor layer on the surface of the anode body, wherein the conductor layer comprises the conductor film described in (6) above.

Advantageous Effects of Invention

The conductor layer formed by the polymer type conductive paste of the present invention has low moisture permeability even in high humidity environments, hence ionization of silver in the conductor layer is suppressed and a highly reliable conductor layer can be obtained.

BRIEF DESCRIPTION OF THE DRAWINGS

FIG. 1: FIG. 1 shows an example of a solid electrolytic capacitor element.

DESCRIPTION OF THE PREFERRED EMBODIMENTS

In the present specification, "polymer type conductive paste" is a term that is used in contrast to "sintering type conductive paste," in which the organic components in the coating film get dissipated by sintering and only inorganic components remain in the resulting conductive film, and means a type of paste in which organic components including binder resin remain in the conductive film obtained by drying and/or curing the coating film.

There are no limitations on the applications of the polymer type conductive paste of the present invention, and it can be used for general electrical circuit wiring and electronic components, such as electrode formation for multilayer ceramic electronic components, etc. However, it is particularly preferred when the polymer type conductive paste of the present invention is used to form the conductor layer in solid electrolytic capacitor elements such as tantalum capacitors, as the operation advantage of the invention can be fully obtained. Examples of application of the polymer type conductive paste of the present invention to the solid electrolytic capacitor element shown in FIG. 1 are explained in the following.

The conductor layer 15 mainly comprises conductive metal powder and polyvinyl butyral resin, and is obtained by applying the polymer type conductive paste of the present invention on the carbon layer 14, heating it to about not less than 120° C. and not greater than 220° C., removing organic solvents, and drying.

The polymer type conductive paste of the invention contains at least conductive metal powder, polyvinyl butyral resin as a binder resin, an organic solvent capable of dissolving the binder resin, and specific additives.

The conductive metal powder contained in the polymer type conductive paste is not limited, but metal powders commonly used in conductive pastes such as silver, copper, nickel, palladium, and aluminum can be used.

Among them, silver powders are particularly preferred, and in addition to pure silver powder, silver-coated powders in which the surface of a metal powder other than silver is coated with silver, composite silver powders in which the surface of silver powder is coated with inorganic and/or organic materials, and even silver alloy powders in which silver is alloyed with metals other than silver may also be used. Hereafter, these are collectively referred to as "silver-based powders" in the present specification. By using silver-based powders, further operation advantage of the invention can be achieved, and it is also advantageous from the viewpoints of conductivity and cost. Furthermore, a mixture of these silver-based powders and other conductive metal powders such as palladium, platinum, copper, and metal oxides may also be used. In any case, the content of the silver component in the total conductive metal powder should preferably be 10 mass % or more.

Conventionally used shapes such as spherical, flake, and dendritic can be used for the conductive metal powders. In addition, for the conductive metal powders, mixtures of two or more types that differ in any one or more properties such as average particle diameter, particle size distribution, and shape can also be used. In the present invention, it is particularly preferable to use a mixture of spherical and flake-shaped silver-based powders, because it is easier to control conductivity, moisture resistance, and other properties.

Polyvinyl butyral resin is used as a binder resin in the polymer type conductive paste in the present invention. "BH—S" (hydroxyl group content=22 mol %), "KS-5" (hydroxyl group content=25 mol %), "BM-5" (hydroxyl group content=34 mol %), "KS-1" (hydroxyl group content=25 mol %), "KS-10" (hydroxyl group content=25 mol %), "SV-02" (hydroxyl group content=22 mol %), "SV-06"

(hydroxyl group content=22 mol %), "SV-22" (hydroxyl group content=22 mol %), etc., all of which are manufactured by Sekisui Chemical Co., LTD. can be used for polyvinyl butyral resin.

In the polymer type conductive paste of the present invention, there is no particular limit to the content of polyvinyl butyral resin, which should be determined according to the required characteristics of the paste, but as an example, the solid component of polyvinyl butyral resin should be not less than 1.0 parts by mass and not more than 20 parts by mass per 100 parts by mass of conductive metal powder.

Resins other than polyvinyl butyral resin may be included as binder resins as long as they do not inhibit the operation advantage of the invention, and examples include cellulose-based resins, acrylic resins, methacrylic resins, epoxy resins, phenol resins, rosin acrylic resins, and the like.

The amount of residual hydroxyl groups in the polyvinyl butyral resin used in the present invention is not particularly limited, but 35 mol % or less is preferred because it increases moisture resistance. The amount of residual hydroxyl groups is further preferred to be 30 mol % or less, and especially 25 mol % or less.

As an organic solvent, any solvent can be used as long as it shows solubility in the binder resin used. Examples of such organic solvents include an alcohol-based, ether-based, ester-based, hydrocarbon-based, or other organic solvents, and two or more of said organic solvents or a mixture of said organic solvents and water can be used if necessary.

The polymer type conductive paste of the present invention is characterized in that it contains as specific additives one or more of the group consisting of stearic acid, lauric acid, octadecylbutanedioic acid, benzoic acid, acetamidophenol, aminophenol, catechol, and N,N-bis(2-hydroxyethyl) coco alkylamine.

These specific additives are sometimes referred to as moisture permeability adjusters in the present specification because they function as moisture permeability adjusters in the pastes of the present invention.

According to the research of the inventors, when a certain amount of these moisture permeability adjusters are blended in a paste containing polyvinyl butyral resin as the binder, the water permeability (moisture permeability) of the film obtained by applying and drying the paste is significantly reduced with almost no adverse effects on conductivity, printability (thixotropy), and other properties. As a result, the moisture resistance of the film can be improved.

Among the above moisture permeability adjusters, octadecylbutanedioic acid is particularly preferred because film density can be increased and ESR is expected to be reduced.

The content of these moisture permeability adjusters per 100 parts by mass of conductive metal powder is not less than 0.01 parts by mass and not more than 3.0 parts by mass. If the content of the moisture permeability adjusters is outside this range, moisture resistance will deteriorate and other properties (conductivity, for example) may be adversely affected. The content of the moisture permeability adjusters is preferably not less than 0.1 parts by mass and not more than 1.5 parts by mass.

Other additives such as general surfactants, defoamers, plasticizers, dispersants, and organic or inorganic fillers may be added to the polymer type conductive paste of the invention as needed and appropriate.

EXAMPLES (1) Experiment 1

Preparation of Conductive Paste

Sample 1

Varnish A is prepared by dissolving 8.6 parts by mass of polyvinyl butyral resin ("BM-5" manufactured by Sekisui Chemical Co., Ltd.; hydroxyl group content=35 mol %) in benzyl alcohol to make 57.2 parts by mass. Varnish A is mixed with 80 parts by mass of flake-shaped silver powder ("Ag-531" manufactured by Shoei Chemical Inc.) and 20 parts by mass of spherical silver powder ("Ag-202" manufactured by Shoei Chemical Inc.), and these are kneaded and stirred using a three-roll mill. The mixture was then diluted with butyl acetate to obtain Sample 1 of a silver paste having a viscosity of 1 Pa·s as measured at a shear rate of 9.3 s$^{-1}$ at 25° C. with a Brookfield viscometer Model HA.

Sample 2

Sample 2 was a silver paste obtained in the same way as for Sample 1, except that Varnish B obtained by changing the polyvinyl butyral resin to "KS-5" (manufactured by Sekisui Chemical Co., Ltd.; hydroxyl group content=25 mol %) was used.

Sample 3

Sample 3 is a silver paste obtained in the same way as for Sample 2, except that 0.5 parts by mass of p-acetamidophenol ("3-hydroxyacetanilide" manufactured by Tokyo Chemical Industry Co., Ltd.) per 100 parts by mass of silver powder was further added to the composition of Sample 2.

Sample 4

Sample 4 is a silver paste obtained in the same way as for Sample 3, except that Stearic acid ("Stearic acid 90" manufactured by Miyoshi Oil and Fat Co., Ltd.) was used instead of acetamidophenol.

Sample 5

Sample 5 is a silver paste obtained in the same way as for Sample 3, except that lauric acid ("lauric acid" manufactured by FUJIFILM Wako Pure Chemical Corporation) was used instead of acetamidophenol.

Sample 6

Sample 6 is a silver paste obtained in the same way as for Sample 3, except that octadecyl butanedioic acid (dicarboxylic acid "Hypermer KD-16" manufactured by Cloda Japan K. K.) was used instead of acetamidophenol.

Sample 7

Sample 7 was a silver paste obtained in the same way as for Sample 3, except that benzoic acid ("benzoic acid" manufactured by FUJIFILM Wako Pure Chemicals Corporation) was used instead of acetamidophenol.

Sample 8

Sample 8 is a silver paste obtained in the same way as for Sample 3, except that aminophenol ("p-aminophenol" manufactured by FUJIFILM Wako Pure Chemicals Corporation) was used instead of acetamidophenol.

Sample 9

Sample 9 was a silver paste obtained in the same way as for Sample 3, except that catechol ("Pyrocatechol" manufactured by FUJIFILM Wako Pure Chemicals Corporation) was used instead of acetamidophenol.

Sample 10

Sample 10 was a silver paste obtained in the same way as for Sample 3, except that N,N-bis(2-hydroxyethyl) coco alkylamine (Esomin "Liponol C/12" manufactured by Lion Specialty Chemicals Co., Ltd.) was used instead of acetamidophenol.

Sample 11

Sample 11 was a silver paste obtained in the same way as for Sample 3, except that stearylamine ("Pharmine 80" manufactured by Kao Corporation) was used instead of acetamidophenol.

(2) Experiment 2

Preparation of Conductive Paste

Samples 12 to 21

Sample 12-21 are silver pastes obtained in the same way as for Sample 3, except that the amounts of conductive metal powder, polyvinyl butyral resin, and acetamidophenol were the amounts listed in Table 2, respectively.

(3) Experiment 3

Preparation of Conductive Paste

Samples 22-25

Sample 22-25 were silver pastes obtained in the same way as for Sample 6, except that the amounts of conductive metal powder, polyvinyl butyral resin, and octadecyl butanedioic acid were the amounts listed in Table 3, respectively.

For each of samples 1-25 of the conductive paste obtained above, the moisture permeability test shown below was conducted to evaluate the amount of moisture permeability of each sample.

The results of the evaluation for samples 1-11 are shown in Table 1, for samples 12-21 in Table 2, and for samples 22-25 in Table 3.

In Tables 1 through 3, samples marked with asterisks (*) are comparative examples.

<Moisture Permeability Test>

The silver paste of each sample was applied on a PET film, heated at 150° C. for 60 minutes, and then peeled off from the PET film to make a dry film with a thickness of 20±2 μm.

Glass containers A, each containing 2g of silica gel, were prepared for each sample, and the openings of each container were sealed with instant adhesive using the dry film of each sample, completely sealing them. After that, the total mass of each glass container A was weighed.

Next, a plastic container B large enough to hold glass container A was prepared, and an appropriate amount of purified water was added through the opening of plastic container B. After placing glass container A into plastic container B while making sure that said purified water did not enter glass container A, the opening of plastic container B was completely sealed. The plastic container B containing glass container A was then heated, and the temperature was raised from room temperature to 65° C., then retained for 15 hours.

After the retention time had elapsed, the plastic container B was slowly cooled, the plastic container B was opened, the glass container A inside was taken out, and the total mass of the glass container A was weighed again. The increase was considered as moisture permeability (mg). In the examples, samples with a moisture permeability of less than 20 mg were determined to be acceptable.

TABLE 1

| Composition of conductive paste | | | | | | | | | | | | |
|---|---|---|---|---|---|---|---|---|---|---|---|---|
| Component Category | Component | *1 | *2 | 3 | 4 | 5 | 6 | 7 | 8 | 9 | 10 | *11 |
| Conductive metal powder [parts by mass] | Silver powder in flake form | 80.0 | 80.0 | 80.0 | 80.0 | 80.0 | 80.0 | 80.0 | 80.0 | 80.0 | 80.0 | 80.0 |
| | Spherical silver powder | 20.0 | 20.0 | 20.0 | 20.0 | 20.0 | 20.0 | 20.0 | 20.0 | 20.0 | 20.0 | 20.0 |
| Polyvinyl butyral resin [Mass part (solid content)] | Varnish A (hydroxyl group 35 mol %) | 8.6 | | | | | | | | | | |
| | Varnish B (hydroxyl group 25 mol %) | | 8.6 | 8.6 | 8.6 | 8.6 | 8.6 | 8.6 | 8.6 | 8.6 | 8.6 | 8.6 |
| Moisture permeability adjuster [parts by mass] | Acetamidophenol | | | 0.5 | | | | | | | | |
| | Stearic acid | | | | 0.5 | | | | | | | |
| | Lauric acid | | | | | 0.5 | | | | | | |
| | Octadecyl butanedioic acid | | | | | | 0.5 | | | | | |
| | Benzoic acid | | | | | | | 0.5 | | | | |
| | Amino phenol | | | | | | | | 0.5 | | | |
| | Catechol | | | | | | | | | 0.5 | | |
| | N,N-bis(2-hydroxyethyl) coco alkylamine | | | | | | | | | | 0.5 | |
| | Stearylamine | | | | | | | | | | | 0.5 |
| Moisture permeability (mg) | | 55.0 | 31.8 | 12.9 | 9.7 | 11.7 | 15.3 | 13.3 | 9.6 | 17.4 | 17.8 | 21.7 |

TABLE 2

Composition of conductive paste

| Component Category | Component | 3 | 12 | *13 | 14 | 15 | *16 | *17 | 18 | 19 | 20 | *21 |
|---|---|---|---|---|---|---|---|---|---|---|---|---|
| Conductive metal powder [parts by mass] | Silver powder in flake form | 80.0 | 80.0 | 80.0 | 80.0 | 80.0 | 80.0 | 80.0 | 100.0 | 0.0 | 80.0 | 80.0 |
|  | Spherical silver powder | 20.0 | 20.0 | 20.0 | 20.0 | 20.0 | 20.0 | 20.0 | 0.0 | 100.0 | 20.0 | 20.0 |
| Polyvinyl butyral resin [Mass part (solid content)] | Varnish B (hydroxyl group 25 mol %) | 8.6 | 8.6 | 8.6 | 8.6 | 8.6 | 8.6 | 8.6 | 8.6 | 8.6 | 5.2 | 12.0 |
| Moisture permeability adjuster [parts by mass] | Acetamidophenol | 0.5 | 0.02 | 0.005 | 0.05 | 0.10 | 5.0 | 10.0 | 0.5 | 0.5 | 0.5 | 0.5 |
| Evaluation results | Moisture permeability (mg) | 12.9 | 9.3 | 21.1 | 10.6 | 13.6 | 37.4 | 57.9 | 11.5 | 13.4 | 16.9 | 10.2 |

TABLE 3

Composition of conductive paste

| Component Category | Component | 6 | *22 | 23 | 24 | *25 |
|---|---|---|---|---|---|---|
| Conductive metal powder [parts by mass] | Silver powder in flake form | 80.0 | 80.0 | 80.0 | 80.0 | 80.0 |
|  | Spherical silver powder | 20.0 | 20.0 | 20.0 | 20.0 | 20.0 |
| Polyvinyl butyral resin [Mass part (solid content)] | Varnish B (hydroxyl group 25 mol %) | 8.6 | 8.6 | 8.6 | 8.6 | 8.6 |
| Moisture permeability adjuster [parts by mass] | Octadecyl-butannic acid | 0.5 | 0.005 | 0.05 | 2.5 | 3.3 |
|  | Moisture permeability (mg) | 15.3 | 28.9 | 18.1 | 9.9 | 22.8 |

(Regarding Evaluation Results)

The results shown in Table 1 indicate that while moisture permeability varies depending on the amount of hydroxyl groups in the polyvinyl butyral resin, moisture permeability further decreases significantly when the moisture permeability adjuster of the invention is contained.

The results shown in Tables 2 and 3 also indicate that neither too much nor too little amount of the moisture permeability adjuster in the conductive paste reduces the effect of reduction of moisture permeability.

Other experiments were conducted in the same way for those of the moisture permeability adjusters used in the examples that have structural isomers, and it was confirmed that even the structural isomers are effective in reduction of moisture permeability.

INDUSTRIAL APPLICABILITY

The invention can be applied to solid electrolytic capacitor elements and multilayer ceramic electronic components.
Explanation of Reference Signs
1 Solid electrolytic capacitor element
11 Valve-action metal sintered body (anode body)
12 Oxide film layer (dielectric layer)
13 Solid electrolyte layer
14 Carbon layer
15 Conductor layer.

The invention claimed is:

1. A polymer type conductive paste characterized in that the polymer type conductive paste contains conductive metal powder, binder resin, organic solvent, and specific additives, wherein
   the binder resin is polyvinyl butyral resin,
   said specific additives are one or more selected from the group consisting of stearic acid, lauric acid, octadecyl butanedioic acid, benzoic acid, acetamidophenol, aminophenol, catechol, and N,N-bis(2-hydroxyethyl) coco alkylamine, and
   said specific additive is contained at the content of not less than 0.01 parts by mass and not more than 3.0 parts by mass per 100 parts by mass of said conductive metal powder.

2. The polymer type conductive paste according to claim 1, wherein said specific additive is octadecyl butanedioic acid.

3. The polymer type conductive paste according to claim 1, wherein the hydroxyl group content in the polyvinyl butyral resin is 30 mol % or less.

4. The polymer type conductive paste according to claim 3, wherein the hydroxyl group content in the polyvinyl butyral resin is 25 mol % or less.

5. The polymer type conductive paste according to claim 1, wherein the conductive metal powder is a silver-based powder.

6. A conductor film characterized in that the conductor film is formed from the polymer type conductive paste according to claim 1.

7. A solid electrolytic capacitor element characterized in that the solid electrolytic capacitor element has at least a dielectric layer, a solid electrolyte layer, a carbon layer, and a conductor layer on the surface of the anode body,
   wherein the conductor layer comprises the conductor film according to claim 6.

* * * * *